(12) United States Patent
Iwanaga

(10) Patent No.: US 8,312,502 B2
(45) Date of Patent: Nov. 13, 2012

(54) RECORDING SYSTEM, RECEIVING APPARATUS AND RECEIVING METHOD, RECORDING APPARATUS AND RECORDING METHOD, AND PROGRAM

(75) Inventor: Masaaki Iwanaga, Tokyo (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/119,677

(22) Filed: May 13, 2008

(65) Prior Publication Data

US 2008/0288997 A1 Nov. 20, 2008

(30) Foreign Application Priority Data

May 15, 2007 (JP) ................................ P2007-129519

(51) Int. Cl.
*H04N 7/173* (2011.01)
(52) U.S. Cl. ............ 725/134; 725/55; 725/88; 725/141; 725/153
(58) Field of Classification Search .................... 725/55, 725/88, 141, 153, 134
See application file for complete search history.

(56) References Cited

U.S. PATENT DOCUMENTS

| 5,936,679 | A | * | 8/1999 | Kasahara et al. | ............. | 348/553 |
| 7,027,716 | B1 | * | 4/2006 | Boyle et al. | ...................... | 386/83 |
| 7,035,363 | B1 | * | 4/2006 | Ikeda | ............................ | 375/356 |
| 2004/0060066 | A1 | * | 3/2004 | Seki et al. | ........................ | 725/80 |
| 2005/0091687 | A1 | * | 4/2005 | Kim et al. | ........................ | 725/58 |
| 2006/0274203 | A1 | * | 12/2006 | Naganuma et al. | ........... | 348/554 |
| 2007/0201836 | A1 | * | 8/2007 | Tsubota et al. | ................. | 386/96 |
| 2007/0250863 | A1 | * | 10/2007 | Ferguson | ........................ | 725/46 |
| 2007/0288967 | A1 | * | 12/2007 | Candelore et al. | ............. | 725/50 |

FOREIGN PATENT DOCUMENTS

| JP | 10-271432 | 10/1998 |
| JP | 11-252487 | 9/1999 |
| JP | 2002-305710 | 10/2002 |
| JP | 2003-134407 | 5/2003 |
| JP | 2004-343535 | 12/2004 |
| JP | 2005-341039 | 12/2005 |
| JP | 2007-6298 | 1/2007 |

* cited by examiner

*Primary Examiner* — Pankaj Kumar
*Assistant Examiner* — Sahar Baig
(74) *Attorney, Agent, or Firm* — Frommer Lawrence & Haug LLP; William S. Frommer

(57) ABSTRACT

A recording system includes: a receiving apparatus that receives a content; and a recording apparatus that records the content received by the receiving apparatus. The receiving apparatus includes reception means for receiving the content, acceptance means for accepting a user's operation instructing to record the received content, generation means for generating a control signal for controlling a recording operation of the recording apparatus according to the accepted operation, and supply means for supplying the received content and the generated control signal to the recording apparatus, and the recording apparatus includes acquisition means for acquiring the content and the control signal supplied from the receiving apparatus, recording means for recording the acquired content, and control means for controlling the recording means according to the acquired control signal.

4 Claims, 3 Drawing Sheets

RECORDING SYSTEM, RECEIVING APPARATUS AND RECEIVING METHOD, RECORDING APPARATUS AND RECORDING METHOD, AND PROGRAM

CROSS REFERENCES TO RELATED APPLICATIONS

The present invention contains subject matter related to Japanese Patent Application JP 2007-129519 filed in the Japanese Patent Office on May 15, 2007, the entire contents of which are incorporated herein by reference.

BACKGROUND OF THE INVENTION

1. Field of the Invention

The present invention relates to a recording system, a receiving apparatus and receiving method, a recording apparatus and recording method, and a program, and, for example, to a recording system, a receiving apparatus and receiving method, a recording apparatus and recording method, and a program, which are suitable for use in a case where video contents received by a receiving apparatus are recorded by a recording apparatus.

2. Description of the Related Art

At present, mediums for providing video contents typified by a television (TV) program are diversified. For example, TV programs are provided through a wireless medium, such as at terrestrial broadcasting or satellite broadcasting, or a cable medium, such as a CATV network, and there is another approach which provides video contents like movies, on demand, over a network typified by the Internet.

To cope with such diversification of video content providing mediums, naturally, there are appearing video content receiving apparatuses which are compatible with various types of video content providing mediums. While there are viewers' demands of recording video contents provided by various providing mediums, video content recording apparatuses do not seem to appear as quickly as the receiving apparatuses even with appearance of new providing mediums.

To record video contents supplied by a new content providing medium, therefore, a recording apparatus having an external input terminal is provided at the subsequent stage of the video content receiving apparatus, and both apparatuses are controlled so that the reception and output timings of the receiving apparatus are synchronized with the recording timing of the recording apparatus.

There is a function, so-called synchro-recording, as a scheme of synchronous control of the reception and output timings with the recording timing. Synchro-recording is a function of the recording apparatus to start recording in response to inputting of a video signal from outside (receiving apparatus in this case) and terminate recording in response to stopping of the input of the video signal (see JP-A-2005-277604, for example).

SUMMARY OF THE INVENTION

In a case where a recording apparatus is provided at the subsequent stage of a receiving apparatus, in general interconnection, the output of the receiving apparatus is input to the external input terminal of the recording apparatus whose output is supplied to a TV receiver serving as a video and audio monitor.

To record a video content received by the receiving apparatus, a video signal and audio signal from the receiving apparatus are input to the recording apparatus to be recorded therein. To merely view, not record, a video content received by the receiving apparatus, a video signal and audio signal are supplied through the recording apparatus to the TV receiver.

With synchro-recording being enabled in the recording apparatus, however, even if a video content received by the receiving apparatus is to be merely viewed, not recorded, the video content will be recorded against the intention of the user, which may result in an insufficient remaining capacity of the recording medium at the time of actually recording a desirable video content.

Thus, it is desirable to accurately record a content output from a receiving apparatus into a recording apparatus.

According to a first embodiment of the present invention, there is provided a recording system having a receiving apparatus that receives a content; and a recording apparatus that records the content received by the receiving apparatus, wherein the receiving apparatus includes reception means for receiving the content; acceptance means for accepting a user's operation instructing to record the received content; generation means for generating a control signal for controlling a recording operation of the recording apparatus according to the accepted operation; and supply means for supplying the received content and the generated control signal to the recording apparatus, and the recording apparatus includes acquisition means for acquiring the content and the control signal supplied from the receiving apparatus; recording means for recording the acquired content; and control means for controlling the recording means according to the acquired control signal.

The supply means and the acquisition means can be HDMI (High-Definition Multimedia Interface) terminals.

According to the first embodiment of the present invention, there is provided a recording method for a recording system having a receiving apparatus that receives a content, and a recording apparatus that records the content received by the receiving apparatus, the method including the steps of by using the receiving apparatus, receiving the content; accepting a user's operation instructing to record the received content; generating a control signal for controlling a recording operation of the recording apparatus according to the accepted operation; supplying the received content and the generated control signal to the recording apparatus; by using the recording apparatus, acquiring the content and the control signal supplied from the receiving apparatus; and recording the acquired content according to the acquired control signal.

According to the first embodiment of the present invention, the receiving apparatus receives a content, accepts a user's operation instructing to record the received content, generates a control signal for controlling a recording operation of the recording apparatus according to the accepted operation, and supplies the received content and the generated control signal to the recording apparatus. The recording apparatus acquires the content and the control signal supplied from the receiving apparatus, and records the acquired content according to the acquired control signal.

According to a second embodiment of the present invention, there is provided a receiving apparatus that receives a content, including reception means for receiving the content; acceptance means for accepting a user's operation instructing to record the received content; generation means for generating a control signal for controlling a recording operation of a recording apparatus according to the accepted operation; and supply means for supplying the received content and the generated control signal to the recording apparatus.

According to the second embodiment of the present invention, there is provided a reception method for a receiving apparatus that receives a content, including the steps of receiving the content; accepting a user's operation instructing to record the received content; generating a control signal for controlling a recording operation of a recording apparatus according to the accepted operation; and supplying the received content and the generated control signal to the recording apparatus.

According to the second embodiment of the present invention, there is provided a program for controlling a receiving apparatus that receives a content, the program allowing a computer in the receiving apparatus to execute a process including the steps of receiving the content; accepting a user's operation instructing to record the received content; generating a control signal for controlling a recording operation of a recording apparatus according to the accepted operation; and supplying the received content and the generated control signal to the recording apparatus.

According to the second embodiment of the present invention, a content is received, a user's operation instructing to record the received content is accepted, a control signal for controlling a recording operation of the recording apparatus according to the accepted operation is generated, and the received content and the generated control signal are supplied to the recording apparatus.

According to a third embodiment of the present invention, there is provided a recording apparatus that records a supplied content, including acquisition means for acquiring the content and a control signal supplied from a receiving apparatus that receives the content; recording means for recording the acquired content; and control means for controlling the recording means according to the acquired control signal.

According to the third embodiment of the present invention, there is provided a recording method for a recording apparatus that records a supplied content, including the steps of acquiring the content and a control signal supplied from a receiving apparatus that receives the content; and recording the acquired content according to the acquired control signal.

According to the third embodiment of the present invention, there is provided a program for controlling a recording apparatus that records a supplied content, the program allowing a computer in the recording apparatus to execute a process including the steps of acquiring the content and a control signal supplied from a receiving apparatus that receives the content; and recording the acquired content according to the acquired control signal.

According to the third embodiment of the present invention, the content and the control signal supplied from the receiving apparatus are acquired, and the acquired content is recorded according to the acquired control signal.

According to the first embodiment of the present invention, the recording apparatus can accurately record a content output from the receiving apparatus.

According to the second embodiment of the present invention, a received content can accurately be recorded in the recording apparatus.

According to the third embodiment of the present invention, a content received by the receiving apparatus can be recorded under control of the receiving apparatus.

DESCRIPTION OF THE PREFERRED EMBODIMENT

Figure 1:
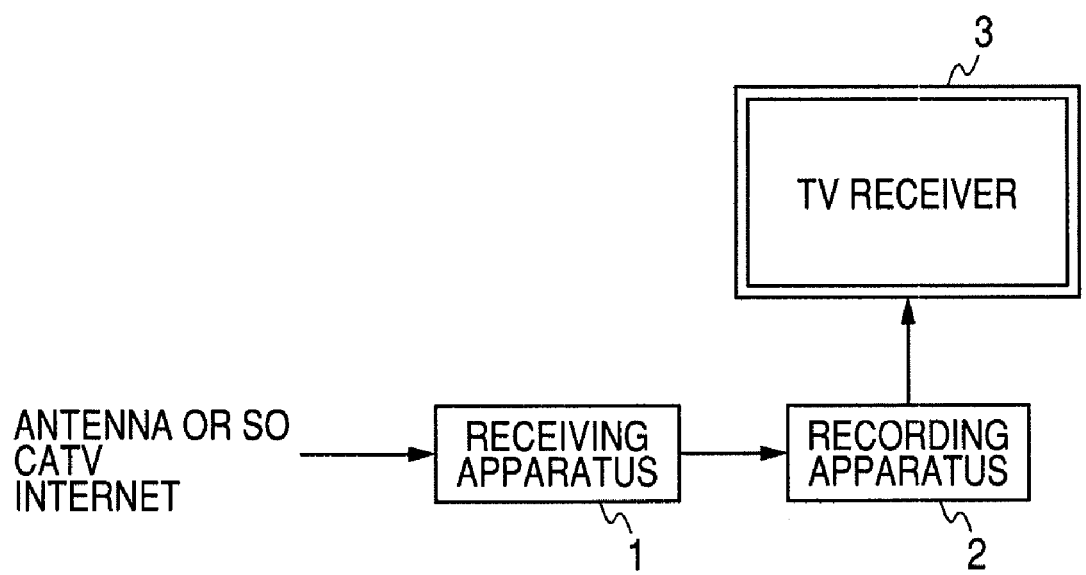
FIG. 1 is a diagram showing the outline of a recording system to which the present invention is adapted.

A preferred embodiment of the present invention will be described below with reference to the accompanying drawings. The correlation between the constituents of the invention and those of the embodiment described or illustrated in the present specification and the accompanying drawings are exemplified as follows. The description is to confirm that an embodiment which supports the present invention is described or illustrated in the present specification and the drawings. Therefore, there may be an embodiment not illustrated herein, but corresponding to the constituents of the invention, which does not mean that the embodiment does not correspond to those constituents. Likewise, an embodiment illustrated herein as corresponding to the constituents of the invention does not imply that the embodiment corresponds only to those constituents and not to any other constituents.

A recording system according to the first embodiment of the present invention has a receiving apparatus (e.g., receiving apparatus 1 in FIG. 1) that receives a content, and a recording apparatus (e.g., recording apparatus 2 in FIG. 1) that records the content received by the receiving apparatus. In the recording system, the receiving apparatus includes reception means (e.g., reception section 13 in FIG. 1) which receives the content, acceptance means (e.g., operational input section 11 in FIG. 1) which accepts a user's operation instructing to record the received content, generation means (e.g., control section 12 in FIG. 1) which generates a control signal for controlling a recording operation of the recording apparatus according to the accepted operation, and supply means (e.g., AV signal output section 14 and control signal output section 15 in FIG. 1) which supplies the received content and the generated control signal to the recording apparatus. The recording apparatus includes acquisition means (e.g., AV signal input section 24 and control signal input section 23 in FIG. 1) which acquires the content and the control signal supplied from the receiving apparatus, recording means (e.g., recording section 26 in FIG. 1) recording the acquired content, and control means (e.g., control section 22 in FIG. 1) which controls the recording means according to the acquired control signal.

According to the first embodiment of the present invention, there is provided a recording method for a recording system having a receiving apparatus that receives a content, and a recording apparatus that records the content received by the receiving apparatus. The recording method includes the steps of, by using the receiving apparatus, receiving the content (e.g., step S4 in FIG. 3), accepting a user's operation instructing to record the received content (e.g., step S1 in FIG. 3), generating a control signal for controlling a recording operation of the recording apparatus according to the accepted operation (e.g., step S3 in FIG. 3), supplying the received content and the generated control signal to the recording apparatus (e.g., steps S3, S4 in FIG. 3), by using the recording apparatus, acquiring the content and the control signal supplied from the receiving apparatus (e.g., step S12 in FIG. 3), and recording the acquired content according to the acquired control signal (e.g., step S13 in FIG. 3).

A specific embodiment to which the present invention is adapted will be described in detail referring to the accompanying drawings.

FIG. 1 shows a configurational example of a recording system to which the present invention is adapted. The recording system includes a receiving apparatus 1 which receives a video content, a recording apparatus 2 which records a video content, and a television (TV) receiver 3 serving as a video and audio monitor for a video content.

The receiving apparatus 1 receives a video content supplied from a providing medium, such as TV broadcasting or a network, and sends a resultant video signal and audio signal (hereinafter, referred to as AV signal) to the recording apparatus 2. The receiving apparatus 1 also generates a control signal for controlling the moving picture operation of the recording apparatus 2.

The recording apparatus 2 records an AV signal, input from the receiving apparatus 1, into a recording medium according to the control signal input from the receiving apparatus 1, or directly outputs the AV signal to the TV receiver 3. The recording apparatus 2 plays back a video content recorded in the recording medium, and sends a resultant AV signal to the TV receiver 3.

The TV receiver 3 displays a video image represented by the AV signal from the recording apparatus 2 and provides an audio output.

Figure 2:
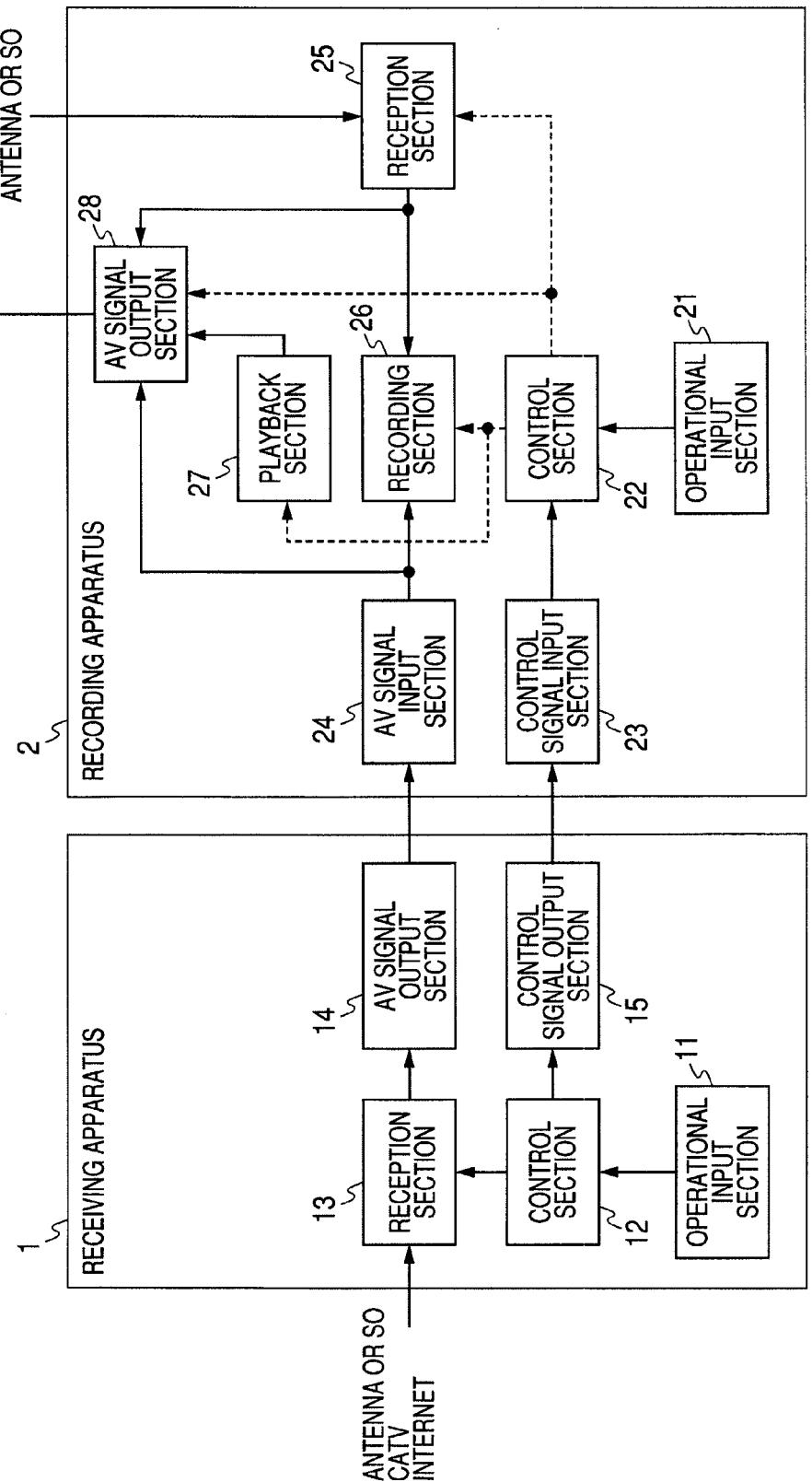
FIG. 2 is a block diagram showing configurational examples of a receiving apparatus and a recording apparatus to which the present invention is adapted.

FIG. 2 shows configurational examples of the receiving apparatus 1 and the recording apparatus 2.

In the receiving apparatus 1, an operational input section 11 accepts a channel selecting operation, a record setting operation or the like performed by a user, and sends an operation signal corresponding to the accepted operation to a control section 12. The control section 12 controls individual sections of the receiving apparatus 1 according to the operation signal from the operational input section 11. The control section 12 generates a control signal for controlling the moving picture operation of the recording apparatus 2.

Under control of the control section 12, a reception section 13 acquires an AV signal representing a video content corresponding to the channel selected by the user from a TV broadcasting signal input from a previous stage, and sends the AV signal to an AV signal output section 14. The AV signal output section 14 sends the AV signal input from the reception section 13 to a subsequent apparatus (recording apparatus 2 in this case). A control signal output section 15 sends a control signal, generated by the control section 12, to a subsequent apparatus (recording apparatus 2 in this case).

A 21-PIN terminal, a control terminal or the like, for example, can be used for the control signal output section 15. The control signal output section 15 and the AV signal output section 14 may be integrated so that, for example, an HDMI (High-Definition Multimedia Interface) terminal or the like is adopted.

In the recording apparatus 2, an operational input section 21 accepts a recording operation, a playback operation or the like performed by the user, and sends an operation signal corresponding to the accepted operation to a control section 22. The control section 22 controls individual sections of the recording apparatus 2 according to the operation signal from the operational input section 21. The control section 22 controls the recording operation of a recording section 26 according to the control signal from the receiving apparatus 1.

A control signal input section 23 sends the control signal input from the receiving apparatus 1 to the control section 22. An AV signal input section 24 sends the AV signal input from the receiving apparatus 1 to the recording section 26 and an AV signal output section 28.

A 21-PIN terminal, a control terminal or the like can be used for the control signal input section 23 like the control signal output section 15 of the receiving apparatus 1. The control signal output section 23 and the AV signal output section 24 may be integrated so that, for example, an HDMI terminal or the like is adopted.

A reception section 25 receives a TV broadcasting program or the like, and sends its AV signal to the recording section 26 and the AV signal output section 28. The recording section 26 encodes and modulates the AV signal input from the AV signal input section 24 or the reception section 25 by a predetermined system, and records a resultant signal in a recording medium (not shown). A playback section 27 reproduces the AV signal recorded in the recording medium and outputs the AV signal to the AV signal output section 28. The AV signal output section 28 sends the AV signal input from the AV signal input section 24, the reception section 25 or the playback section 27 to a subsequent stage (TV receiver 3 in this case) under control of the control section 22.

Figure 3:
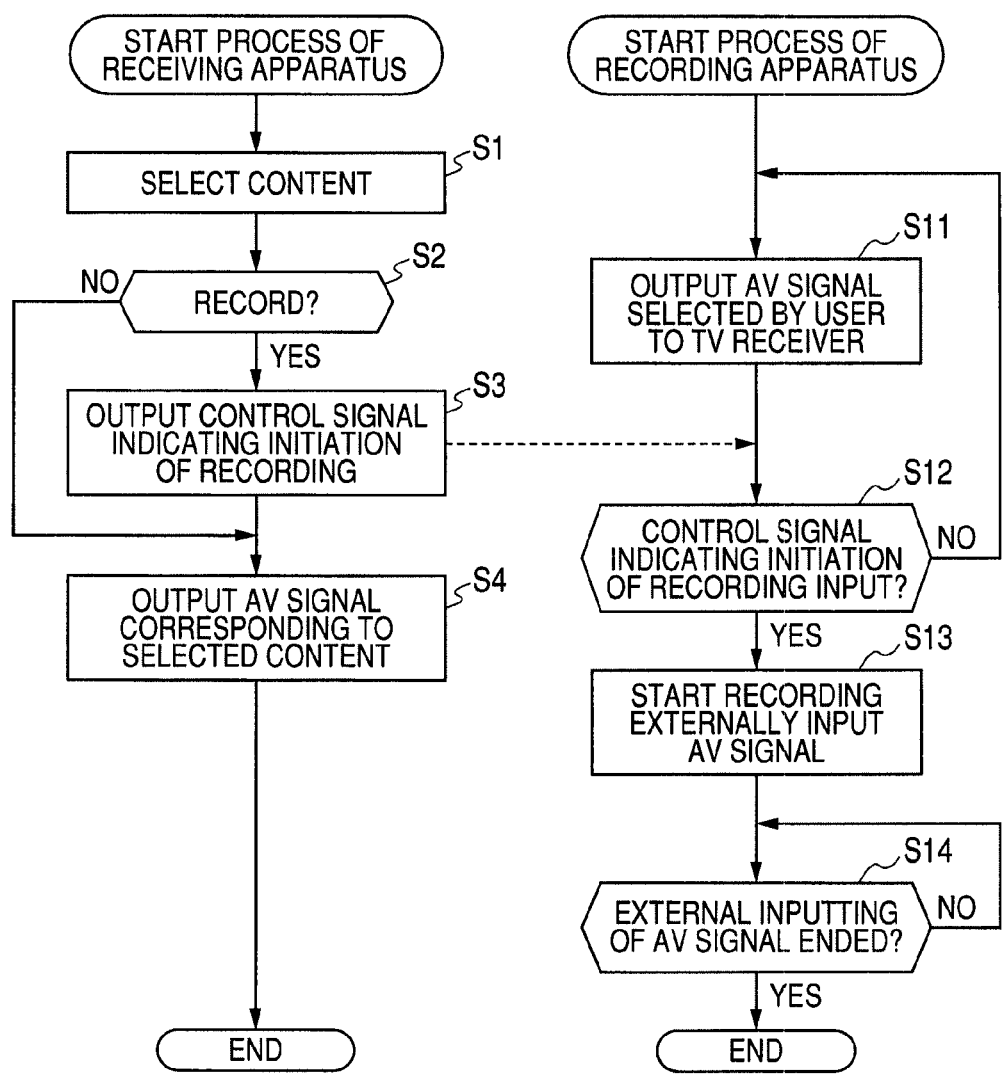
FIG. 3 is a flowchart illustrating the operations of the receiving apparatus and recording apparatus to which the present invention is adapted.

Next, a process of recording a video content involving the receiving apparatus 1 and the recording apparatus 2 will be explained referring to a flowchart in FIG. 3.

In the receiving apparatus 1 which executes the process, the operational input section 11 accepts a user's operation of selecting a video content to be received in step S1. Specifically, the operational input section 11 allows the user to select a video content using a GUI (Graphical User Interface), such as EPG (Electric Program Guide) and designate a date, a time and a channel. Further, the operational input section 11 accepts an operation of selecting whether a video content to be received is to be simply viewed or is to be recorded. Then, the operational input section 11 sends an operation signal corresponding to the accepted operation to the control section 12.

In step S2, based on the operation signal input from the operational input section 11, the control section 12 determines whether the video content selected by the user is to be recorded or not. When it is determined that the video content is to be recorded, the process goes to step S3. In step S3, the control section 12 generates a control signal to instruct the recording apparatus 2 to start recording, and sends the control signal to the control signal output section 15. The control signal output section 15 sends the control signal to instruct initiation of recording to the recording apparatus 2.

In step S4, the reception section 13 receives the video content selected by the user and sends an AV signal corresponding to the video content to the AV signal output section 14 under control of the control section 12. The AV signal output section 14 starts outputting the AV signal input from the reception section 13 to the recording apparatus 2 at the subsequent stage, and continues outputting the AV signal until the selected video content ends.

In a case where it is determined in step S2 that the video content is not to be recorded but viewed, step S3 is skipped so that the process proceeds to step S4.

The recording apparatus 2 stands by until a control signal instructing initiation of recording is input from the receiving apparatus 1. During the standby period, for example, the AV signal selected by the user (AV signal input from the AV signal input section 24, the reception section 25 or the playback section 27) is output to the TV receiver 3 at the subsequent stage.

That is, in the recording apparatus 2, the AV signal output section 28 sends the AV signal input from the AV signal input section 24, the reception section 25 or the playback section 27 to the TV receiver 3 at the subsequent stage under control of the control section 22 based on the user's operation in step S11. In step S12, the control section 22 stands by until the control signal instructing initiation of recording is input from the receiving apparatus 1 via the control signal input section 23. When it is determined that the control signal has been input, the process proceeds to step S13.

In step S13, the recording section 26 encodes and modulates the AV signal from the receiving apparatus 1, input from the AV signal input section 24, by a predetermined system, and starts recording a resultant signal in the recording medium under control of the control section 22. In step S14, the recording section 26 monitors if inputting of the AV signal from the AV signal input section 24 is ended. When inputting of the AV signal from the AV signal input section 24 ends in step S14, recording of the AV signal in the recording medium is terminated. The above is the end of the description of the video content recording process executed by the receiving apparatus 1 and the recording apparatus 2.

In the foregoing description, recording by the recording apparatus 2 is terminated triggered by the end of inputting of an AV signal from the receiving apparatus 1. However, when a video content selected by the user ends, a control signal to instruct the recording apparatus 2 to terminate recording may be output to the recording apparatus 2 from the receiving apparatus 1, and recording may be terminated triggered by the control signal.

As described above, the recording system according to the embodiment of the present invention can accurately record a video content. The recording system can also suppress that recording unintended by a user occupies the recording medium.

The present invention can also be adapted to a case where an audio content as well as a video content is recorded.

The above-described sequence of processes can be executed by hardware or software.

In the present specification, "system" represents an entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A recording system comprising:
a receiving apparatus that receives audio/video (A/V) content from an external source; and
a recording apparatus connected to said receiving apparatus to record the A/V content received by the receiving apparatus, wherein
the receiving apparatus includes
reception means for receiving the A/V content from the external source,
an operational input section to receive (i) a user's record selection operation to record the received A/V content and (ii) the absence of the user's record selection operation so as to simply view but not record the received A/V content,
generation means for generating a recording control signal for instructing a recording operation of the recording apparatus when the operational input section receives the user's record selection operation, and
supply means for supplying the received A/V content and the generated recording control signal to the recording apparatus, and
the recording apparatus includes
a reception section, separate from the reception means of the receiving apparatus, for receiving A/V content from an external source,
A/V input means for receiving the A/V content from the supply means of the receiving apparatus,
control signal input means for receiving the recording control signal supplied from the generation means of the receiving apparatus,
an operational input means, separate from the operational input section of the receiving apparatus, to receive a user's playback operation input to produce a corresponding playback operation signal,
a control section to receive the recording control signal generated by the generation means of the receiving apparatus and received by the control signal input means of the recording apparatus, and to receive the playback operation signal from the operational input means of the recording apparatus,
recording means disposed in a standby mode and for changing to a record mode for recording the received A/V content when the control signal input means of the recording apparatus receives from the generation means of the receiving apparatus the recording control signal,
playback means for playing back previously recorded A/V content when the recording means is disposed in the standby mode and the control section of the recording apparatus receives the playback operation signal from the operational input means, and
an A/V output section coupled to said A/V input means and to said playback means for supplying to an output device (A) the A/V content received by the A/V input means of the recording apparatus from the supply means of the receiving apparatus when the recording means is disposed in the standby mode and the control signal input means of the recording apparatus does not receive the recording control signal from the generation means of the receiving apparatus, (B) the A/V content received from an external source by the reception section of the recording apparatus when the recording means is disposed in the standby mode, and (C) the A/V content played back by said playback means when the recording means is disposed in the standby mode and the operational input means of the recording apparatus produces the playback operation signal.

2. The recording system according to claim 1, wherein the supply means and the A/V input means are HDMI (High-Definition Multimedia Interface) terminals.

3. A recording method for a recording system having a receiving apparatus that receives audio/video (A/V) content from an external source, and a recording apparatus that records the A/V content received by the receiving apparatus and that also receives A/V content from an external source, the method comprising the steps of:
using the receiving apparatus to,
receive the A/V content from the external source;
receive (i) a user's record selection operation to record the received A/V content and (ii) the absence of the user's record selection operation so as to simply view but not record the received A/V content;
generating a recording control signal for instructing a recording operation of the recording apparatus when the user's record selection operation is received and
supplying the received A/V content and the generated recording control signal to the recording apparatus; and
using the recording apparatus to,
receive A/V content from an external source;
receive the A/V content and the generated recording control signal supplied from the receiving apparatus;

receive a user's playback operation input to produce a corresponding playback operation signal, receive the recording control signal from the receiving apparatus and receive the playback operation signal produced by the user's playback operation input;

disposing the recording apparatus in a standby mode and changing over to a record mode for recording the received A/V content when the recording control signal is received from the receiving apparatus;

playing back previously recorded A/V content when the recording apparatus is disposed in the standby mode and the playback operation signal is produced by the user's playback operation input; and supplying to an output device (A) the A/V content received from an external source by the receiving apparatus when the recording apparatus is disposed in the standby mode and the control signal generated in the receiving apparatus is not the recording control signal, (B) the A/V content received from an external source by the recording apparatus when the recording apparatus is disposed in the standby mode, and (C) the played back A/V content when the recording apparatus is disposed in the standby mode and the playback operation signal, that is produced in response to the user's playback operation input, is received.

4. A recording system comprising:

a receiving apparatus that receives audio/video (A/V) content from an external source; and a recording apparatus connected to said receiving apparatus to record the A/V content received by the receiving apparatus, wherein the receiving apparatus includes
- a reception section receiving the A/V content from the external source,
- an operational input section to receive (i) a user's record selection operation to record the received A/V content and (ii) the absence of the user's record selection operation so as to simply view but not record the received A/V content,
- a generation section generating a recording control signal for instructing a recording operation of the recording apparatus when the operational input section receives the user's record selection operation, and
- a supply section supplying the received A/V content and the generated recording control signal to the recording apparatus, and the recording apparatus includes
- a reception section, separate from the reception means of the receiving apparatus, for receiving A/V content from an external source,
- an input section for receiving the A/V content from the supply section and the recording control signal supplied from the receiving apparatus,
- an operational input section, separate from the operational input section of the receiving apparatus, to receive a user's playback operation input to produce a corresponding playback operation signal,
- a control section to receive the recording control signal supplied by the supply section of the receiving apparatus and received by the input section of the recording apparatus, and to receive the playback operation signal from the operational input section of the recording apparatus,
- a recording section disposed in a standby mode and for changing to a record mode for recording the received A/V content when the input section of the recording apparatus receives from the supply section of the receiving apparatus the recording control signal,
- a playback section for playing back previously recorded A/V content when the recording section is disposed in the standby mode and the control section of the recording apparatus receives the playback operation signal from the operational input section of the recording apparatus, and
- an A/V output section coupled to said input section and to said playback section for supplying to an output device (A) the A/V content received by the input section of the recording apparatus from the supply section of the receiving apparatus when the recording section is disposed in the standby mode and the control section of the recording apparatus does not receive the recording control signal from the supply section of the receiving apparatus, (B) the A/V content received from an external source by the reception section of the recording apparatus when the recording means is disposed in the standby mode, and (C) the A/V content played back by said playback section when the recording section is disposed in the standby mode and the operational input section of the recording apparatus produces the playback operation signal.

* * * * *